United States Patent [19]

Stein et al.

[11] Patent Number: 4,853,709
[45] Date of Patent: Aug. 1, 1989

[54] INTERNAL DRUM PLOTTER

[75] Inventors: Amnon Stein, Ramat Gan; Michael Nagler, Tel Aviv, both of Israel

[73] Assignee: Scitex Corporation Ltd., Herzlia Bet., Israel

[21] Appl. No.: 102,330

[22] Filed: Sep. 29, 1987

[30] Foreign Application Priority Data

Oct. 7, 1986 [IL] Israel ........................................ 80241

[51] Int. Cl.$^4$ ........................ G01D 9/42; G02B 26/08
[52] U.S. Cl. .................................... 346/108; 346/160; 350/6.5; 350/6.9
[58] Field of Search ................ 346/108, 107 R, 76 L, 346/160; 350/6.5, 6.9

[56] References Cited

U.S. PATENT DOCUMENTS 4,475,787 10/1984 Starkweather .
4,684,228 8/1987 Holthusen ........................... 346/108
4,780,730 10/1988 Dodge .................................. 346/108

OTHER PUBLICATIONS

Computer Technology Review, Summer 1984, pp. 199–203.
Manufactures Catalog, FIRE 900, Macdonald Dettwiler & Associates, Ltd., Richmond, British Colombia, Canada.

Primary Examiner—E. A. Goldberg
Assistant Examiner—Mark Reinhart
Attorney, Agent, or Firm—Finnegan, Henderson, Farabow, Garrett and Dunner

[57] ABSTRACT

An internal drum plotter including a laser source producing a laser beam output, apparatus for modulating the laser beam output to apply information content thereto, apparatus for supporting laser recording material in a generally circular cylindrical configuration about a cylinder axis and scanning apparatus for receiving the modulated laser beam and reflecting it onto the laser recording material, the scanning apparatus including a stabilized reflector arranged for rotation about the cylinder axis for reflecting the modulated laser beam directly onto the laser recording material, wherein the stabilized reflector is insensitive to wobble in the position thereof in directions perpendicular to the cylinder axis.

15 Claims, 6 Drawing Sheets

INTERNAL DRUM PLOTTER

FIELD OF THE INVENTION

The present invention relates to laser plotters and more particularly to internal drum plotters.

BACKGROUND OF THE INVENTION

Various types of laser plotters are known in the art. There are two general types: flat bed plotters and drum plotters.

Both types are well known, and are produced and marketed by several companies including the present application/assignee.

Plotters of the internal drum variety have been proposed but technical problems requiring complex optomechanical solutions have made such plotters a relatively expensive product. An example of one such internal drum plotter is described in Computer Technology Review, Summer, 1984, pages 199-203 and in a catalog sheet issued by the manufacturer, Macdonald Dettwiler and Associates Ltd., of Richmond, British Colombia, Canada. This device, identified as FIRE 9000 is stated to include a single faceted air bearing spinner and precision linear micropositioner for ensuring high line quality and geometric accuracy.

Penta prisms, which are known to be insensitive to wobbling in directions perpendicular to the axis of rotation thereof, have been used in flat bed scanners, as shown in U.S. Pat. No. 4,475,787 to Starkweather, but have not been proposed for use in internal drum scanners. In the Starkweather patent, which is particularly suited for flat bed plotters, the penta prism is arranged in association with a lens in the path of the output light beam from the penta prism for focusing the parallel planes of the light beam into a fine point of light defining a scan line. While Starkweather deals adequately with the problem of wobble, it greatly reduces the effective duty cycle of the apparatus, thus significantly slowing its operation.

SUMMARY OF THE INVENTION

The present invention seeks to provide an internal drum plotter which overcomes the disadvantages of the prior art internal drum scanners, is relatively inexpensive, has a high duty cycle, and is highly accurate, eliminating distortions which are inherent in flat bed plotters.

There is thus provided in accordance with a preferred embodiment of the present invention an internal drum plotter including a laser source producing a laser beam output, apparatus for modulating the laser beam output to apply information content thereto, apparatus for supporting laser recording material in a generally circular cylindrical configuration about a cylinder axis and scanning apparatus for receiving the modulated laser beam and reflecting it onto the laser recording material, the scanning apparatus including a stabilized reflector arranged for rotation about the cylinder axis for reflecting the modulated laser beam directly onto the laser recording material, wherein the stabilized reflector is insensitive to wobble in the position thereof in directions perpendicular to the cylinder axis.

The stabilized reflector is preferably a penta prism by may alternatively be a combination of mirrors which is similarly insensitive to wobble in the position thereof in directions perpendicular to the cylinder axis.

Additionally in accordance with a preferred embodiment of the present invention the apparatus for supporting includes means for securing the recording material against a cylindrical support surface by exerting a compressive force thereon in the plane of the material, tangentially to the cylinder axis.

Further in accordance with a preferred embodiment of the present invention, there is also provided automatic apparatus for feeding and removing the recording material in association with the apparatus for supporting, thereby enabling the internal drum scanner to be operated outside of a darkroom environment.

Additionally in accordance with a preferred embodiment of the present invention apparatus is provided for displacing the scanning apparatus axially along the cylinder axis and for synchronizing the axial motion of the scanner with the rotation of the stabilized reflector.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
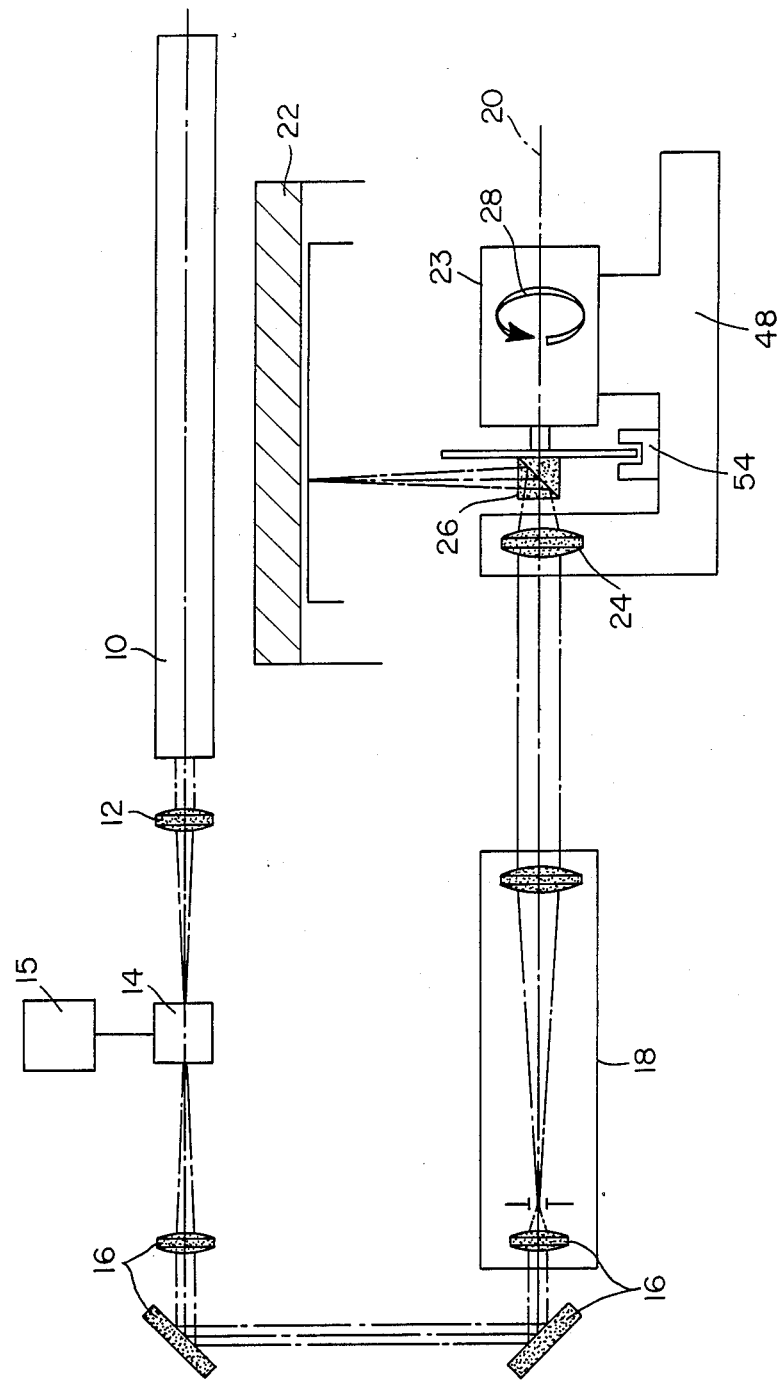
FIG. 1 is an optical diagram of the optical train of the internal drum scanner constructed and operative in accordance with a preferred embodiment of the present invention.

Reference is now made to FIGS. 1-6, which illustrate an internal drum plotter constructed and operative in accordance with a preferred embodiment of the present invention. The internal drum plotter comprises a laser source 10, typically a 4 milliwatt Helium-Neon laser which produces a laser beam output which is focused by a lens 12 onto a modulator 14, such as a model AOM 125 manufactured by Interaction Corp of Chicago, Ill. The modulator 14, typically an acousto-optic modulator is activated by a computer 15 (FIG. 6) and is operative to insert information content sought to be recorded by the plotter. The modulator is typically capable of switching the laser beam on and off up to 15 million times per second.

The modulated output of modulator 14 is supplied via bending and folding optics 16 to a beam expander 18, which is operative to recollimate, enlarge and spatially filter the modulated beam and to direct it along an axis 20 of a circular cylindrical support 22.

The relatively wide output (typically 0.5 inches in diameter) of beam expander 18 impinges on a scanner assembly 23, comprising a focusing lens 24 and a stabilized reflector 26, preferably a penta prism, which is driven for rotation about axis 20 as by an electric motor 28. The entire scanner assembly 23 is arranged for selectable displacement along axis 20, such that the beam reflected from stabilized reflector 26 can impinge on every usable area on the inside of the cylinder support 22. It is a particular characteristic of internal drum scanners that the distance between reflector 26 and support 22 is precisely equal at every location along the cylinder. Accordingly, distortions arising in flat bed scanners need not be corrected for.

Figure 2:
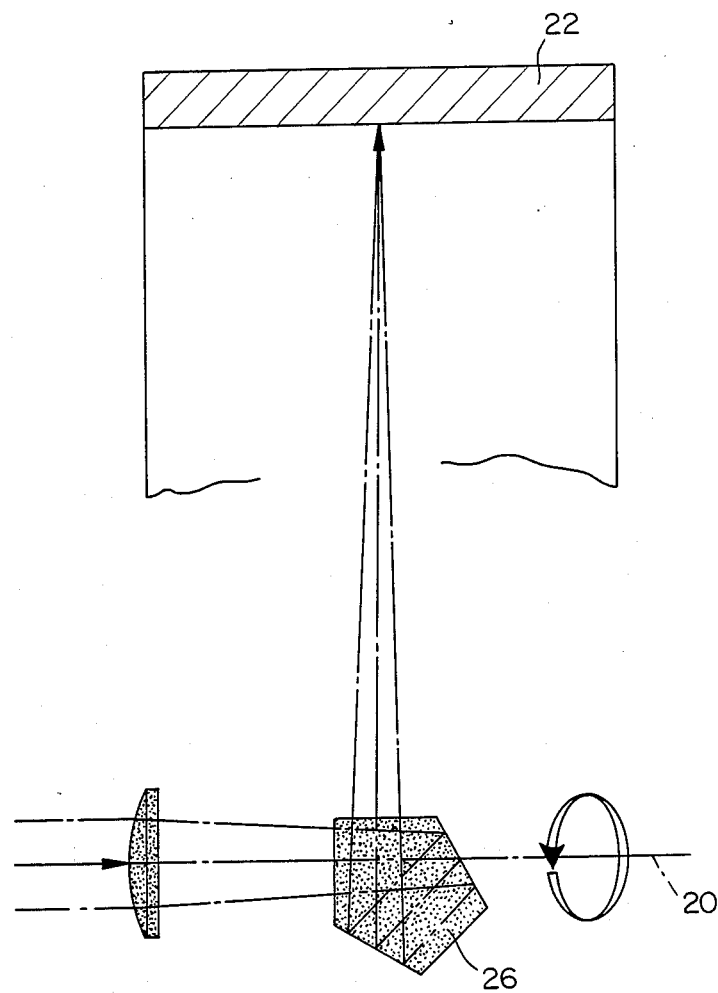
FIGS. 2 and 3 are respective side and perspective view illustrations of part of the apparatus of FIG. 1.
Figure 3:
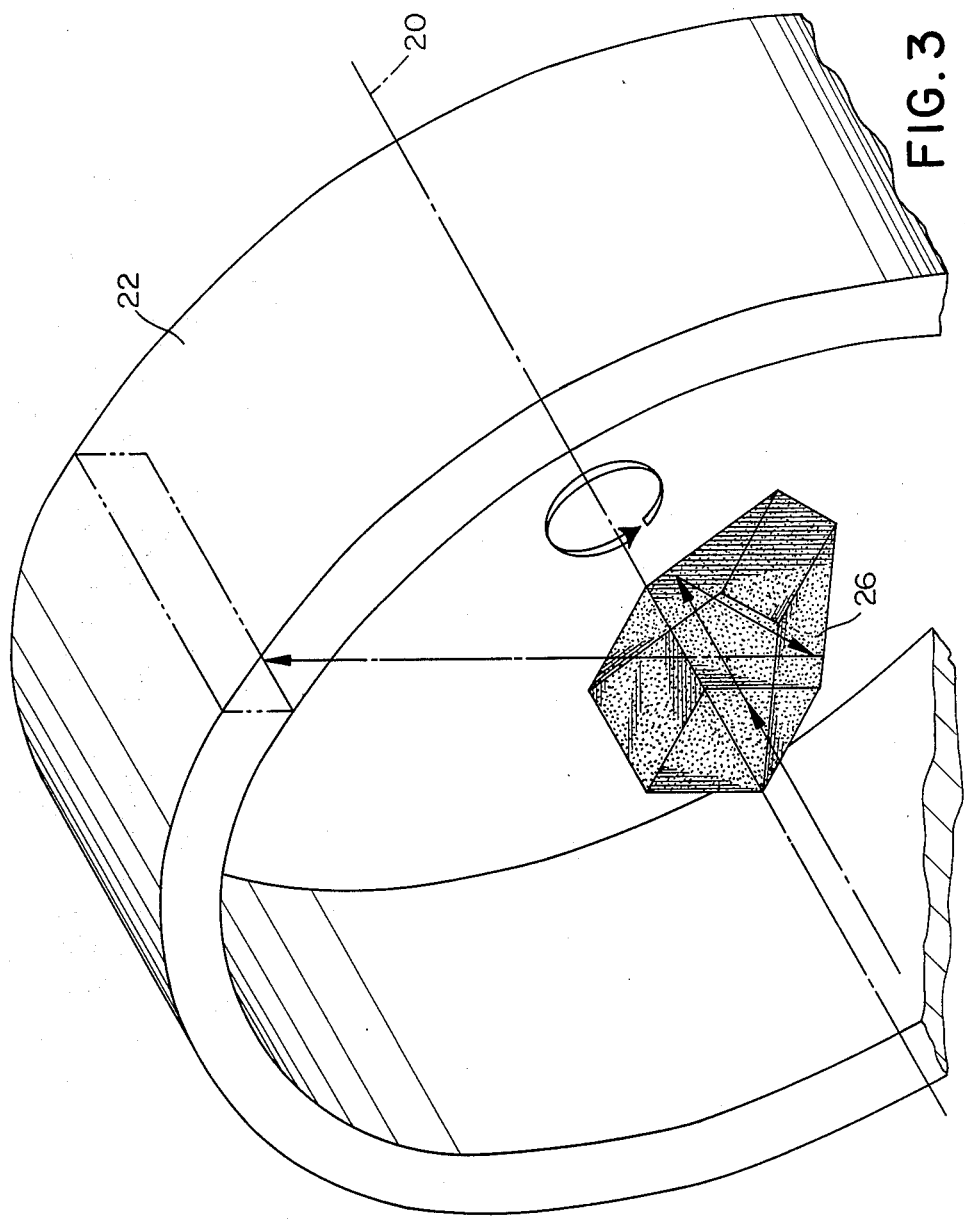

FIGS. 2 and 3 illustrate graphically the path of the light rays through the stabilized reflector 26 in the form of a penta prism to the cylindrical support 22. It is a particular feature of the stabilized reflector that it is insenstive to wobble in directions perpendicular to the axis of its rotation, (herein axis 20). Accordingly the use of highly accurate bearings for the scanner assembly 23 (FIG. 1) may be obviated, significantly reducing the cost and complexity of manufacture and maintenance of the apparatus.

Figure 4:
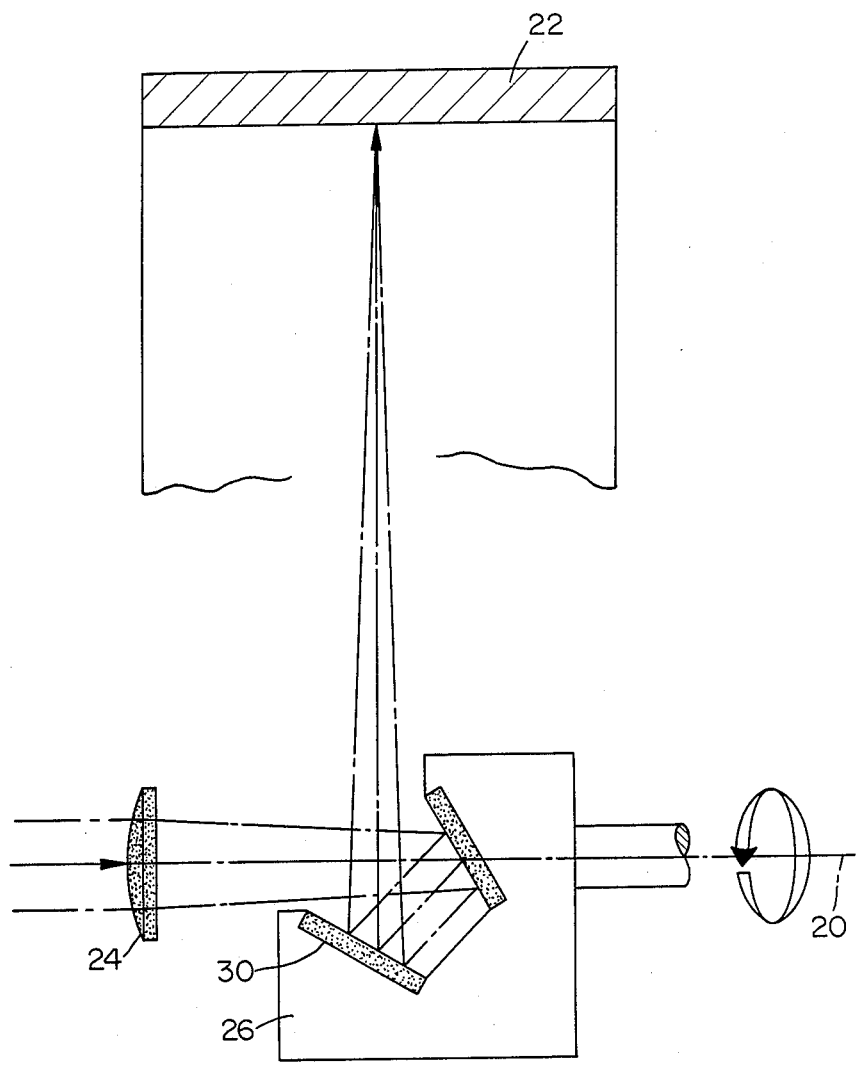
FIG. 4 is a side illustration corresponding to FIG. 2 for an alternative embodiment of internal drum scanner employing a combination of mirrors instead of a penta prism.

FIG. 4 illustrates an alternative embodiment of the present invention wherein the stabilized reflector 26 comprises an arrangement of an even number of mirrors 30 rigidly coupled to each other instead of a penta prism, as in the embodiments of FIGS. 2 and 3. The advantage of using mirrors as in this embodiment, is that the laser beam does not have a significant distance to travel through glass and thus accompanying distortions, including chromatic distortions, are avoided. The disadvantage of using mirors however, is that it is significantly more expensive.

Figure 5:
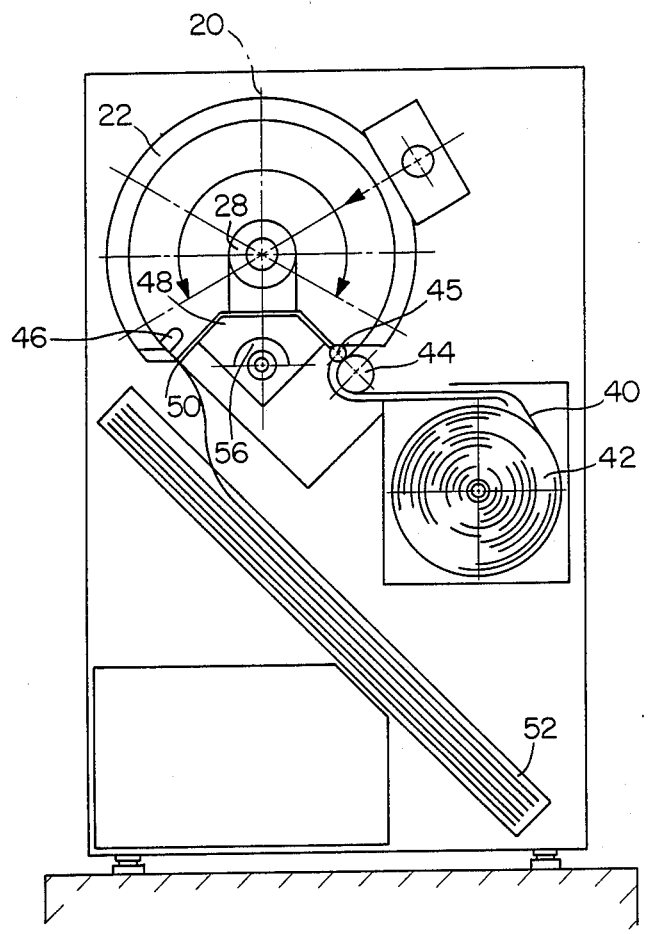
FIG. 5 is a side view illustration of the apparatus of FIG. 1, showing the path of the recording material therethrough.

FIG. 5 illustrates the apparatus of FIG. 1 in a side-view sectional illustration, which shows the path of recording material 40, such as film, through the apparatus. Typically the film 40 is stored in roll from in an input cassette 42, which is optically sealed from the outside. Film 40 is fed by a film driving roller 44 so that it lies in tight engagement with the inner surface of cylinder support 22. In contrast to prior art internal drum scanners, no vacuum system is required to maintain the film in tight engagement with the inner surface. Tight engagement is provided by applying a compression force in the plane of the film, as by roller 44 co-operating with a film pressure roller 45, when the opposite edge of the film engages a film stop bar 46. This compressive force forces the film to bow outwardly into tight engagement with the inner surface of support 22.

The scanner assembly, including a carriage 48, motor 28 and rotary encoder is shown disposed along axis 20 within cylinder support 22.

Upon conclusion of the plotting operation for a given portion of film, the film may be cut by a cutter 50 and allowed to fall into an output cassette 52, which is also optically sealed, so that it can be removed without requiring the entire apparatus to be maintained in darkroom conditions.

Figure 6:
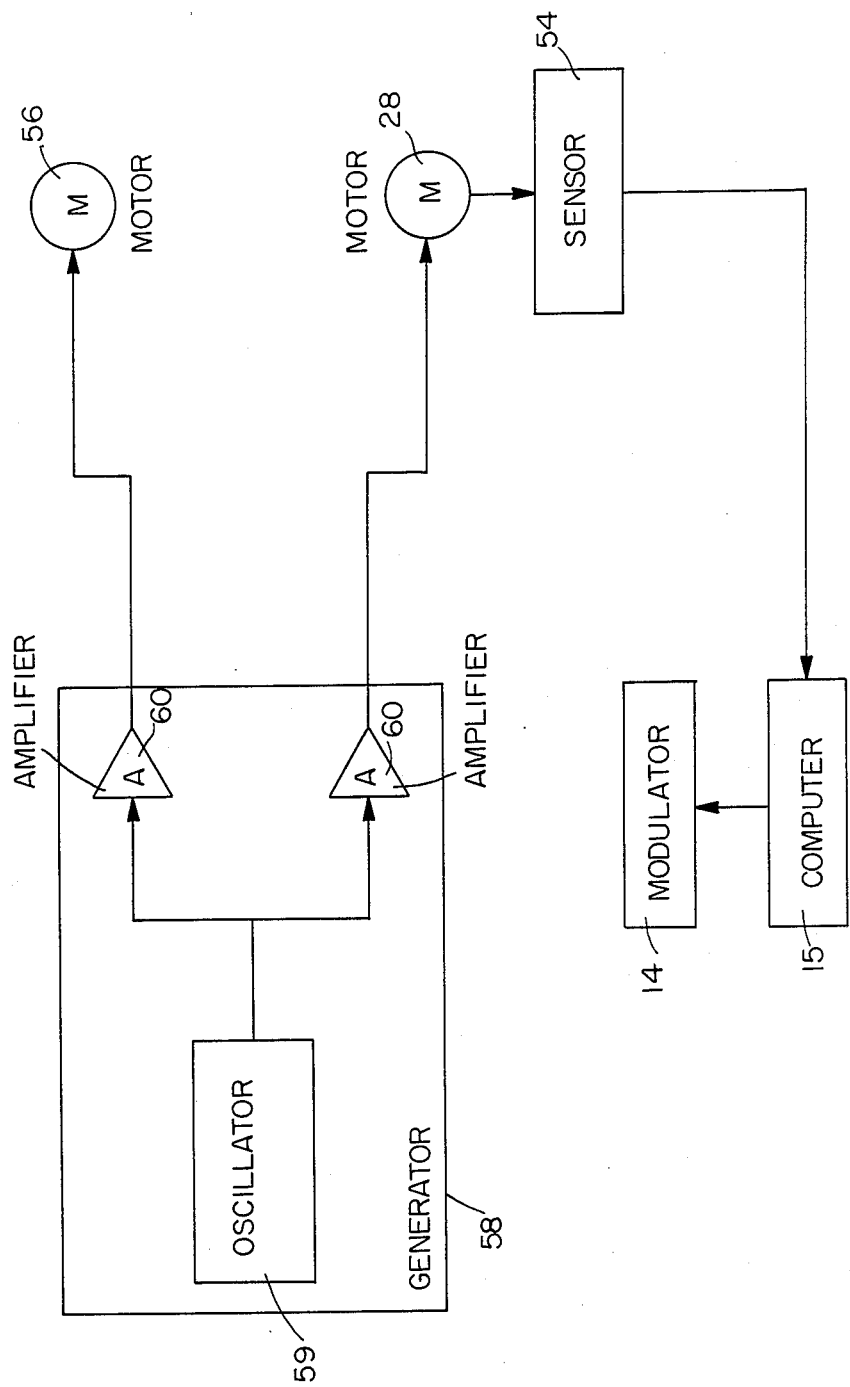
FIG. 6 is a block diagram illustration of the interconnections between the various optomechanical components of the plotter, illustrating information flows and synchronization.

Referring now to FIG. 6, it is seen that the supply of data to modulator 14 is synchronized with the speed of rotation of the stabilized reflector 26, as sensed by a sensor 54. (FIG. 1). Preferably the liner motion of the scanner assembly 23, produced by a lead-screw motor 56 is synchronized with the speed of motor 28, both of which are synchronous motors, which receive alternating current drive inputs from a common generator 58. Motor 56 is typically a multi-terminal motor which provides smooth movement even at relatively low rotational speeds. The current generator 58 typically comprises a crystal oscillator 59 having frequencies of about 400 Hz and about 200 Hz and a pair of power amplifiers 60, each of which provides an output to one of the two motors 28 and 56.

Linear motion of carriage 48 is provided along linear bearings typically comprising a nylon molybdenum sulfide alloy pressed onto teflon-coated aluminum. This type of bearing has a number of advantages such as; the absence of contaminant liquids, no requirement for periodic lubrication, a lower friction coefficient, negligible wear, a small difference between the static and dynamic friction coefficients and low cost.

It will be appreciated by persons skilled in the art that the present invention is not limited by what has been particularly shown and described hereinabove, rather the scope of the present invention is defined only by the claims which follow:

We claim:

1. An internal drum plotter comprising:
 a laser source producing a laser beam output;
 means for modulating the laser beam output to apply information content thereto;
 means for supporting laser recording material in a generally circular cylindrical configuration about a cylinder axis; and
 scanning means for receiving the modulated laser beam and reflecting it onto the laser recording material, the scanning means including a focusing lens located interior the supporting means and a pentaprism stabilized reflector receiving the modulated laser beam output via said focusing lens, said pentaprism, but no said focusing lens, being rotatable about the cylinder axis, said pentaprism being operative for reflecting the modulated laser beam directly onto the laser recording material, wherein the stabilized reflector is insensitive to wobble in the position thereof in directions perpendicular to the cylinder axis.

2. An internal drum plotter according to claim 1 and wherein said stabilized reflector comprises a penta prism.

3. An internal drum plotter according to claim 1 and wherein said stabilized reflector comprises a combination of mirrors which is insensitive to wobble in the position thereof in directions perpendicular to the cylinder axis.

4. An internal drum plotter according to claim 1 and wherein said means for supporting includes means for securing the recording material against a cylindrical support surface by exerting a compressive force thereon in the plane of the material, tangentially to the cylinder axis.

5. An internal drum plotter according to claim 2 and wherein said means for supporting includes means for securing the recording material against a cylindrical support surface by exerting a compressive force thereon in the plane of the material, tangentially to the cylinder axis.

6. An internal drum plotter according to claim 3 and wherein said means for supporting includes means for securing the recording material against a cylindrical support surface by exerting a compressive force thereon in the plane of the material, tangentially to the cylinder axis.

7. An internal drum plotter according to claim 1 and also comprising automatic apparatus for feeding and removing the recording material in association with the apparatus for supporting, thereby enabling the internal drum plotter to be operated outside of a darkroom environment.

8. An internal drum plotter according to claim 2 and also comprising automatic apparatus for feeding and removing the recording material in association with the apparatus for supporting, thereby enabling the internal drum plotter to be operated outside of a darkroom environment.

9. An internal drum plotter according to claim 3 and also comprising automatic apparatus for feeding and removing the recording material in association with the apparatus for supporting, thereby enabling the internal drum plotter to be operated outside of a darkroom environment.

10. An internal drum plotter according to claim 4 and also comprising automatic apparatus for feeding and removing the recording material in association with the apparatus for supporting, thereby enabling the internal drum plotter to be operated outside of a darkroom environment.

11. An internal drum plotter according to claim 1 and also comprising means for synchronizing the supply of data to the modulating means with the axial displacement of the scanning means and the rotation of the stabilized reflector.

12. An internal drum plotter comprising:
a laser source producing a laser beam output;
means for modulating the laser beam output to apply information content thereto;
means for supporting laser recording material in a generally circular cylindrical configuration about a cylinder axis, including means for securing the recording material against a cylindrical support surface by exerting a compressive force thereon in the plane of the material, tangentially to the cylinder axis; and
scanning means for receiving the modulated laser beam and reflecting it onto the laser recording material, the scanning means including a focusing lens located interior the supporting means, and a pentaprism stabilized reflector receiving the modulated laser beam output via said focusing lens, said pentaprism, but not said focusing lens, being rotatable about the cylinder axis, said pentaprism being operative for reflecting the modulated laser beam directly onto the laser recording material, wherein the stabilized reflector is insensitive to wobble in the position thereof in directions perpendicular to the cylinder axis.

13. An internal drum plotter comprising:
a laser source producing a laser beam output;
means for modulating the laser beam output to apply information content thereto;
means for supporting laser recording material in a generally circular cylindrical configuration about a cylinder axis;
scanning means for receiving the modulated laser beam and reflecting it onto the laser recording material, said scanning means comprising a stabilized reflector;
automatic means for feeding and removing the recording material in association with the apparatus for supporting, thereby enabling the internal drum plotter to be operated outside of a darkroom environment; and
means for displacing the scanning means axially along the cylinder axis and for synchronizing the axial motion of the scanner means with the rotation of the stabilized reflector, the means for displacing including leaner bearings.

14. An internal drum plotter according to claim 12 and also comprising means for synchronizing the supply of data to the modulating means with the axial displacement of the scanning means and the rotation of the stabilized reflector.

15. An internal drum plotter according to claim 13 and also comprising means for synchronizing the supply of data to the modulating means with the axial displacement of the scanning means and the rotation of the stabilized reflector.

* * * * *